(12) United States Patent
Cousins et al.

(10) Patent No.: US 6,732,094 B1
(45) Date of Patent: May 4, 2004

(54) METHOD AND APPARATUS THAT EVALUATE AN EXPRESSION BASED UPON DATABASE RESULTS

(75) Inventors: William R. Cousins, Columbia, SC (US); Franz Badias, Lexington, SC (US); William S. Means, Columbia, SC (US)

(73) Assignee: NCR Corporation, Dayton, OH (US)

( * ) Notice: Subject to any disclaimer, the term of this patent is extended or adjusted under 35 U.S.C. 154(b) by 887 days.

(21) Appl. No.: 09/112,261

(22) Filed: Jul. 8, 1998

(51) Int. Cl.⁷ .............................................. G06F 17/30

(52) U.S. Cl. .................... 707/5; 707/3; 707/4

(58) Field of Search .................. 707/1–8, 100, 707/102, 103, 104, 200, 205, 10; 705/29

(56) References Cited

U.S. PATENT DOCUMENTS

| | | | |
|---|---|---|---|
| 5,398,199 A | 3/1995 | Lefons | 708/446 |
| 5,613,110 A | 3/1997 | Stuart | 701/1 |
| 5,664,172 A | 9/1997 | Antoshenkov | 707/4 |
| 5,706,494 A | 1/1998 | Cochrane et al. | 707/2 |

*Primary Examiner*—Alford Kindred
(74) *Attorney, Agent, or Firm*—Maginot, Addison & Moore LLP

(57) ABSTRACT

One step of a method of evaluating an expression includes generating a database query that is representative of the expression. Another step of the method includes processing the database query to obtain database result information from a database. The method also includes the step of resolving the expression to an expression value by analyzing the database result information. A computer readable medium that configures a processor to evaluate an expression is also disclosed.

20 Claims, 5 Drawing Sheets

FIG. 3

```
1   Boolean PerformAnonymousQuery(SQLQuery, CountMaxRows, EvaluateAsAnd)
2       ExecuteQuery SQLQuery
3       CountResultRows = 0
4       While More Result Rows
5           CountResultRows = CountResultRows + 1
6       End While
7       If EvaluateAsAnd = TRUE Then
8           If CountResultRows = CountMaxRows Then
9               Return TRUE
10          Else
11              Return FALSE
12          Else If
13      Else
14          If CountResultRows >= 1 Then
15              Return TRUE
16          Else
17              Return FALSE
18          End If
19      End If
```

US 6,732,094 B1

METHOD AND APPARATUS THAT EVALUATE AN EXPRESSION BASED UPON DATABASE RESULTS

BACKGROUND OF THE INVENTION

The present invention relates generally to evaluating expressions, and more particularly to method and apparatus that evaluate an expression based upon results obtained from a database.

Computer systems commonly need to perform actions in response to a defined condition being satisfied. Accordingly, computer systems need to determine whether the defined condition has been satisfied so that the computer system may take the appropriate actions. Prior art systems have typically determined whether a defined condition has been satisfied by directly evaluating a Boolean expression that defines the condition.

A Boolean expression includes operands and operators. In particular, the operators define a relationship between the operands. If the operands satisfy the defined relationship then the Boolean expression evaluates to a truth value of true; otherwise, the Boolean expression evaluates to a truth value of false. For example, (Day="Monday") AND (Year="1998") is a Boolean expression where Day, "Monday", Year, and "1998" are operands and (,), AND, and=are operators. Moreover, the operands of the Boolean expression are typically either (i) literals such as "Monday" and "1998" that do not change in value during the operation, or (ii) variables such as Day and Year that represent values which may change during operation.

Evaluation of an arbitrary Boolean expression is a somewhat complex process. In particular, a process which evaluates the arbitrary Boolean expression must (i) determine whether the syntax of the Boolean expression is valid, and (ii) determine how to correctly evaluate the Boolean expression if the syntax of the Boolean expression is valid. To this end, the process typically parses the Boolean expression to generate a data structure such as a binary tree structure which represents the generated Boolean expression. Then, the process traverses the generated data structure in order to resolve the Boolean expression to a truth value.

Existing databases already (i) determine whether the syntax of a database query is valid, (ii) determine whether records of the database satisfy the criteria of the database query, and (iii) generate a database result table that includes each record of the database which satisfies the criteria of the database query. Since much of the processing of a database query by a database is akin to the processing required to resolve a Boolean expression to a truth value, what is needed is a method and apparatus that evaluate an arbitrary Boolean expression by offloading a portion of the processing burden to a database, and resolving the Boolean expression based upon results obtained from the database.

SUMMARY OF THE INVENTION

In accordance with one embodiment of the present invention, there is provided a method of evaluating an expression. One step of the method includes generating a database query that is representative of the expression. Another step of the method includes processing the database query to obtain database result information from a database. The method also includes the step of resolving the expression to an expression value by analyzing the database result information.

Pursuant to another embodiment of the present invention, there is provided a method of evaluating a Boolean expression that includes a first subexpression. One step of the method includes generating a database query that is representative of the Boolean expression. Another step of the method includes processing the database query to obtain a database result table that includes a first result row if a first database row of a database table satisfies the first subexpression. Moreover, the method includes the step of resolving the Boolean expression to a truth value by analyzing the database result table.

Pursuant to yet another embodiment of the present invention, there is provided a computer readable medium that configures a processor to evaluate a Boolean expression that includes a first sub-expression. The computer readable medium includes a plurality of instructions. The plurality of instructions when executed by the processor causes the processor to generate a database query that is representative of the Boolean expression. The plurality of instructions when executed by the processor also causes the processor to process the database query to obtain a database result table that includes a first result row if a first database row of a database table satisfies the first sub-expression. The plurality of instructions when executed by the processor further causes the processor to resolve the Boolean expression to a truth value by analyzing the database result table.

It is an object of the present invention to provide a new and useful method and apparatus for evaluating expressions.

It is another object of the present invention to provide an improved method and apparatus for evaluating expressions.

It is an additional object of the present invention to provide a method and apparatus that evaluate an arbitrary Boolean expression in a manner that does not require direct evaluation of the Boolean expression.

It is yet another object of the present invention to provide a method and apparatus that offloads a portion of the processing of a Boolean expression to a database.

The above and other objects, features, and advantages of the present invention will become apparent from the following description and the attached drawings.

BRIEF DESCRIPTION OF THE DRAWINGS

FIG. 3 shows a pseudo-code representation of a software function that configures a processor to generate a value that is representative of truth of a Boolean expression;

DETAILED DESCRIPTION OF A PREFERRED EMBODIMENT

Figures 1, 6:
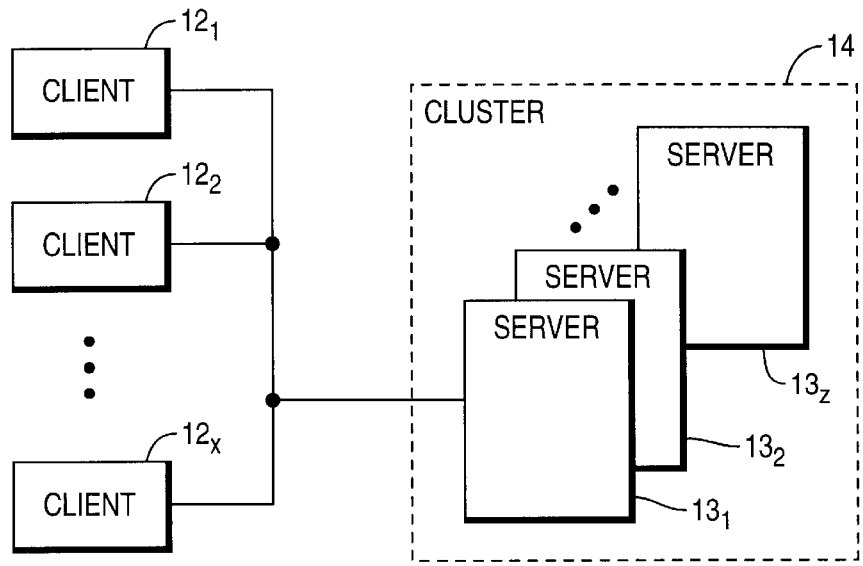
FIG. 1 shows a simplified block diagram of a computer network upon which a management system that incorporates features of the present invention may be implemented.
FIG. 6 shows the contents of a sample database and the contents of a sample database result table.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

FIG. 1 illustrates a computer network 8 upon which a management system 10 (see FIG. 2) may be implemented. The computer network 8 in a preferred embodiment includes client computers $12_1 \ldots 12_X$ which are connected to a Microsoft Windows NT server $13_Y$ or a cluster 14 of Microsoft Windows NT servers $13_1 \ldots 13_Z$ that execute various software routines.

Figure 2:
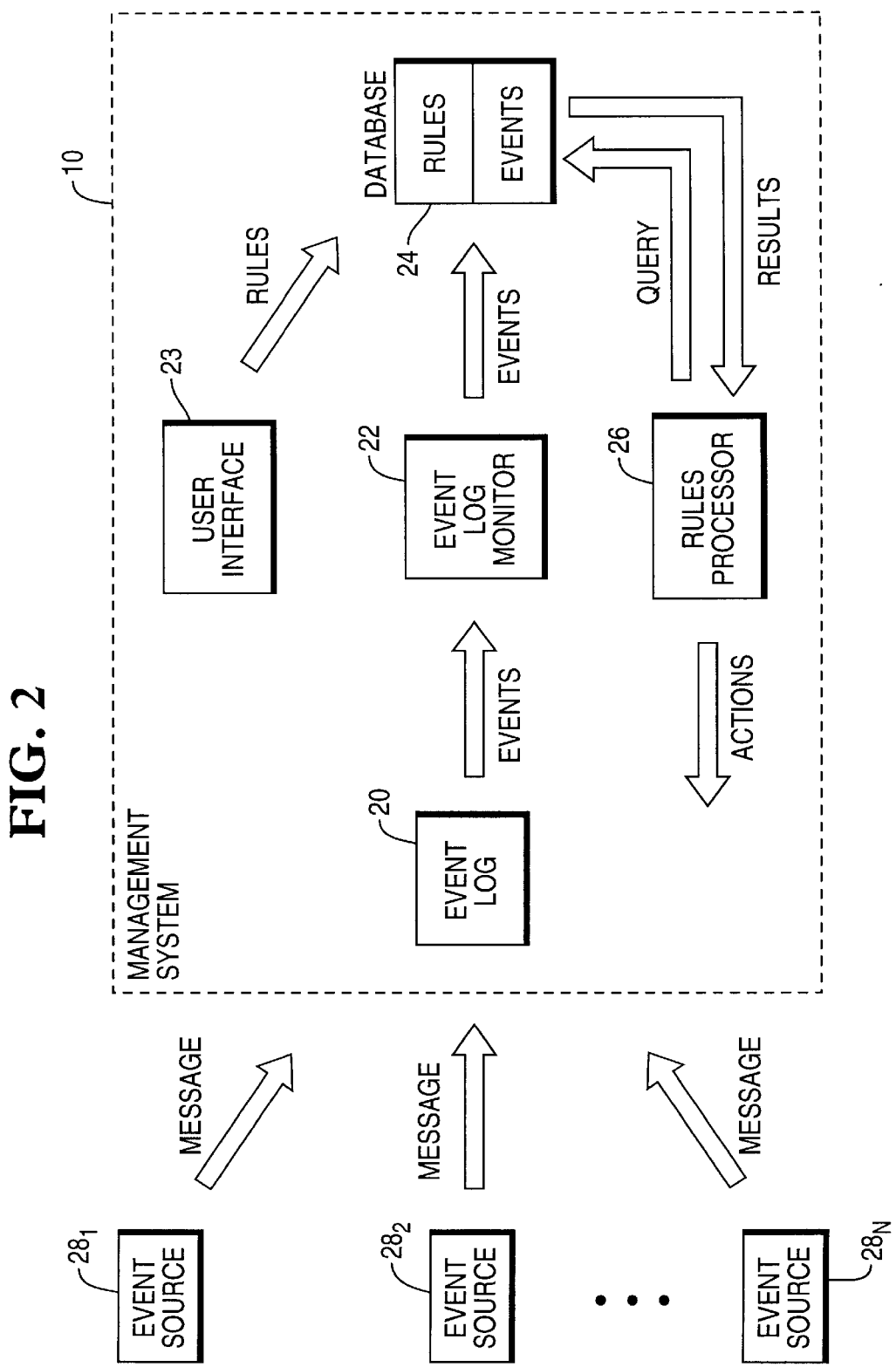
FIG. 2 shows a simplified diagram of the management system of FIG. 1.

A simplified functional diagram of the management system 10 is illustrated in FIG. 2. The various functional components illustrated in FIG. 2 may be (i) implemented upon a single server $13_Y$, (ii) distributed across the servers $13_1 \ldots 13_Z$ of the cluster 14, or (iiii) distributed across the client computers $12_1 \ldots 12_X$ and the servers $13_1 \ldots 13_Z$ of the cluster 14. Moreover, while the invention is disclosed in a Microsoft Windows NT server environment, features of the present invention may be implemented in other environments.

As illustrated in FIG. 2, the management system 10 includes an event log 20, an event log monitor 22, a user interface 23, a database 24, and a rules processor 26. The event log 20 is operable to store event information obtained from event messages generated by event sources $28_1 \ldots 28_N$. Each event source $28_M$ is generally a software application that has registered with the management system 10. Moreover, each event source $28_M$ generally generates an event message after the event source $28_M$ (i) performs various functions, and/or (ii) encounters various conditions. For example, an event source $28_M$ may generate an event message in response to the event source $28_M$ encountering a disk error.

The event log monitor 22 is operable to monitor the contents of the event log 20. Moreover, the event log monitor 22 is operable to generate database commands in response to additional information being added to the event log 20. In particular, the event log monitor 22 generates the database commands such that when the database 24 processes the database commands the additional information of the event log 20 either (i) updates a corresponding row of information stored in the database 24, or (ii) adds an additional row of information to the database 24 if the database 24 does not already contain a corresponding row of information.

The user interface 23 provides a graphical interface that enables a user to (i) define rules, and (ii) associate an action or a group of actions to each defined rule. In particular, the user interface 23 allows a user to define a rule as a set of user established conditions that must be satisfied before the associated actions are executed. For example, a rule may establish (i) where a specific event must occur (e.g. a specified computer, work group, or domain), (ii) when a specific event must occur (e.g. a specified day, time, range of times, etc.), or (iii) the number of times the event must occur before the event triggers an action.

The actions associated with the rules in the preferred embodiment may include notifying, logging, or running a pre-determined application. For example, execution of an action may cause the management system 10 to (i) send a page, (ii) send an e-mail, (iii) log an event to the printer, or (iv) run a diagnostic application. Moreover, an action may include several actions to be executed when the associated rule is satisfied. In other words, the rules processor 26 may cause several actions to occur such as notifying various applications, logging various information, and running various applications all in response to conditions of a single rule being satisfied.

In a preferred embodiment of the present invention, the user interface 23 limits a user to defining a rule as either (i) a series of conditions that are joined by a logical AND operator, or (ii) a series of conditions that are joined by a logical OR operator. Moreover, in the preferred embodiment, the user interface 23 and the event log monitor 22 cooperate to insure that if a condition of a user defined rule is satisfied, then the condition is satisfied by information contained in a single database row of the database 24.

The database 24 stores event information and user defined rule information used by the management system 10 in response to database commands received from the event log monitor 22 and the user interface 23. Moreover, the database 24 (i) receives database queries that request information stored in the database 24, and (ii) generates database result tables that include the requested information in response to processing the received database queries. In the preferred embodiment, the database 24 is implemented as a Microsoft SQL (structured query language) database in which is stored various records of data in a conventional manner. While the database 24 in the preferred embodiment is implemented as a Microsoft SQL database, the management system 10 may be implemented with a database that utilizes a different database structure.

The rules processor 26 of the management system 10 is operable to process user defined rules. In particular, the rules processor 26 is operable to (i) determine whether the conditions of a defined rule have been satisfied, and (ii) trigger the actions associated with the defined rule in response to determining that the defined rule has been satisfied. Since the rules processed by the rules processor 26 are user defined, a first user defined rule may include different conditions than a second user defined rule. Accordingly, the rules processor 26 must be able to determine whether the conditions of an arbitrarily defined rule have been satisfied.

The conditions of a rule essentially define a Boolean expression that must be satisfied before the rules processor 26 triggers the action associated with the rule. Since in the preferred the user interface 23 limits a user to defining a rule as either (i) a series of conditions joined by a logical AND operator, or (ii) a series of conditions joined by a logical OR operator, a user defined rule essentially defines a Boolean expression that includes either (i) a series of sub-expressions that are joined with a logical AND operator or (ii) a series of sub-expressions that are joined with a logical OR operator. Accordingly, the rules processor 26 may determine whether the conditions of an arbitrarily defined rule have been satisfied by determining whether a Boolean expression that represents the defined rule evaluates to a true value.

To this end, the rules processor 26 is operable to (i) generate parameters that are passed to a software function PerformAnonymousQuery, and (ii) cause a processor or a group of processors of the management system 10 to execute the software function PerformAnonymousQuery. In particular, the rules processor 26 generates the parameters such that when the software function PerformAnonymousQuery is executed the management system 10 generates a truth value that is indicative of whether conditions of a rule have been satisfied.

The software function PerformAnonymousQuery is represented in FIG. 3 with pseudo-code that is loosely based upon the C software language. As illustrated, the software function PerformAnonymousQuery is a Boolean function that when executed by a processor or a combination of processors of the management system 10 causes the management system 10 to generate a truth value of either a true value or a false value. In particular, the software function PerformAnonymousQuery causes the processor to generate the truth value based upon a first parameter SQLQuery, a second parameter CountMaxRows, and a third parameter EvaluateAsAnd.

The first parameter SQLQuery is a character string that represents a database query. In the preferred embodiment of the present invention, the rules processor 26 generates the first parameter SQLQuery such that the database query represents a Boolean expression that is indicative of a user defined rule. The second parameter CountMaxRows represents an integer value that is indicative of a maximum number of rows expected in a database result table. The third parameter EvaluateAsAnd represents a Boolean value that is indicative of whether the software function PerformAnonymousQuery should cause the management system 10 to resolve the Boolean expression represented by the first parameter SQLQuery as if the Boolean expression consists of (i) a group of sub-expressions that are joined by a logical AND operator, or (ii) a group of sub-expressions that are joined by a logical OR operator.

In response to executing the software function PerformAnonymousQuery, the management system 10 passes the first parameter SQLQuery to the database 24 for processing. In particular, line 2 of the software function PerformAnonymousQuery causes the database 24 to (i) receive the first parameter SQLQuery which represents a database query, (ii) process the database query represented by the first parameter SQLQuery, and (iii) generate a database result table that includes information of the database 24 that satisfies the criteria of the database query.

After the database 24 generates the database result table, the software function PerformAnonymousQuery causes the management system 10 to count the rows of information contained in the database result table. To this end, line 3 of the software function PerformAnonymousQuery causes the management system 10 to set a first variable CountResultRows equal to an initial value of zero, and lines 4 through 6 of the software function PerformAnonymousQuery cause management system 10 to increment the first variable CountResultRows by one for each row of information contained in the database result table.

After counting the rows of information contained in the database result table, the software function PerformAnonymousQuery causes the management system 10 to return a truth value for the Boolean expression that is based upon (i) the number of rows contained in the database result table, (ii) the maximum number of rows the management system 10 expected the database result table to contain, and (iii) whether the management system 10 is to evaluate the Boolean expression as a logical AND expression or a logical OR expression.

In particular, if the management system is to evaluate the Boolean expression as a logical AND expression, then the software function PerformAnonymousQuery causes the management system 10 to return a true value if the database result table includes exactly one row of information for each sub-expression of the Boolean expression. To this end, lines 7 through 13 of the software function PerformAnonymousQuery cause the management system 10 to return a true value if (i) the third parameter EvaluateAsAnd equals a true value, and (ii) the first variable CountResultRows equals the second parameter CountMaxRows. However, if (i) the third parameter EvaluateAsAnd equals a true value, and (ii) the first variable CountResultRows does not equal the second parameter CountMaxRows, then lines 7 through 13 of the software function PerformAnonymousQuery cause the management system 10 to return a false value.

Similarly, if the management system 10 is to evaluate the Boolean expression as a logical OR expression, then the software function PerformAnonymousQuery causes the management system 10 to return a false value if the database result table contains at least one row of information. To this end, lines 14 through 19 of the software function PerformAnonymousQuery cause the management system 10 to return a false value if (i) the third parameter EvaluateAsAnd does not equal a true value, and (ii) the first variable CountResultRows is greater than or equal to one. However, if (i) the third parameter EvaluateAsAnd does not equal a true value, and (ii) the first variable CountResultRows is not greater than or equal to one, then lines 14 through 19 of the software function PerformAnonymousQuery cause the management system 10 to return a false value.

Figure 4:
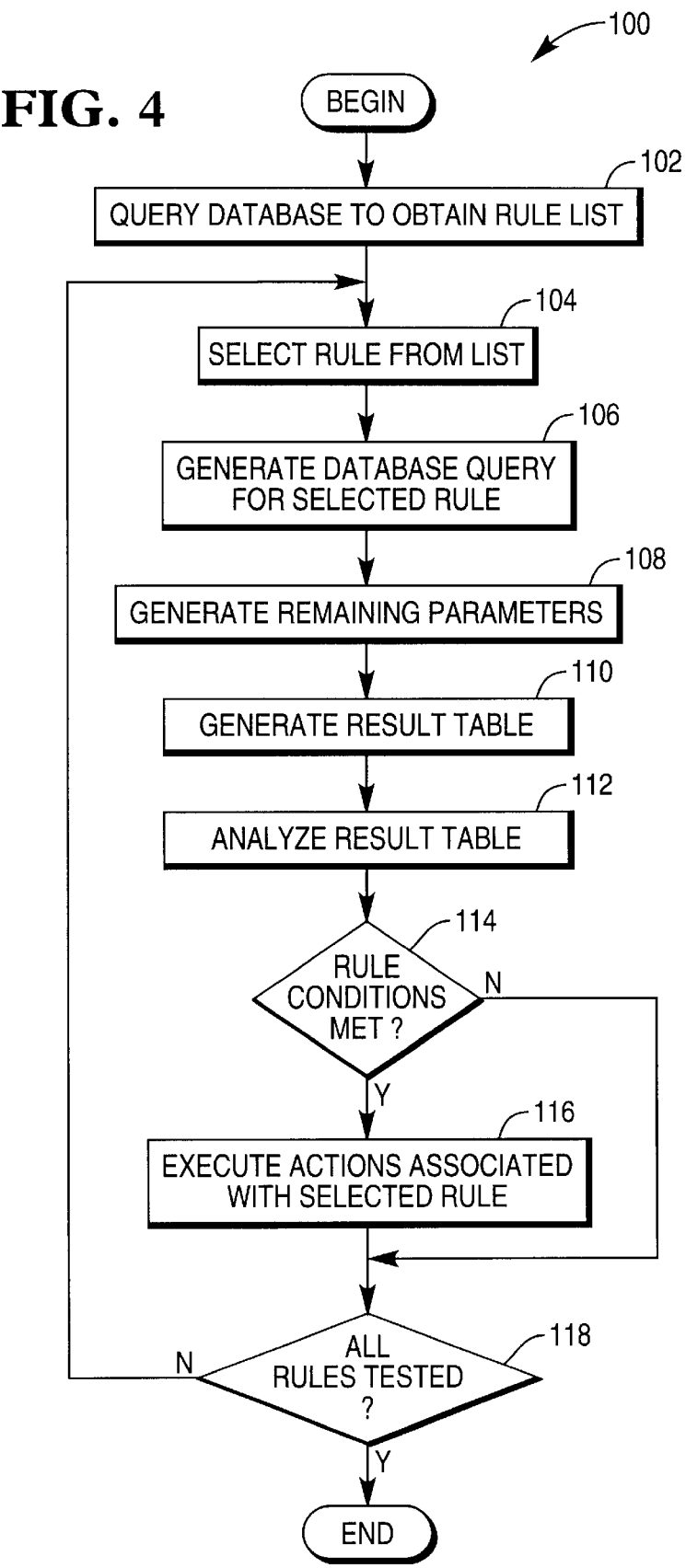
FIG. 4 shows a flowchart of a rule evaluation method used by the management system of FIG. 2.

Shown in FIG. 4 is a rule evaluation method 100 used by the management system 10 to determine whether a defined rule has been satisfied. In particular, the management system 10 in the preferred embodiment executes the detection method 100 upon (i) any change to the information stored in the database 24, and/or (ii) a predetermined periodic interval. The management system 10 in step 102 queries the database 24 to obtain a rule list that contains the rules that have been defined in the management system 10.

Then, the management system 10 in step 104 selects a rule from the rule list. After selecting a rule, the management system 10 in step 106 generates the first parameter SQLQuery for the software function PerformAnonymousQuery. In particular, the management system 10 generates a database query which represents a Boolean expression that evaluates to true if and only if the conditions defined by the selected rule have been satisfied.

Figure 5:
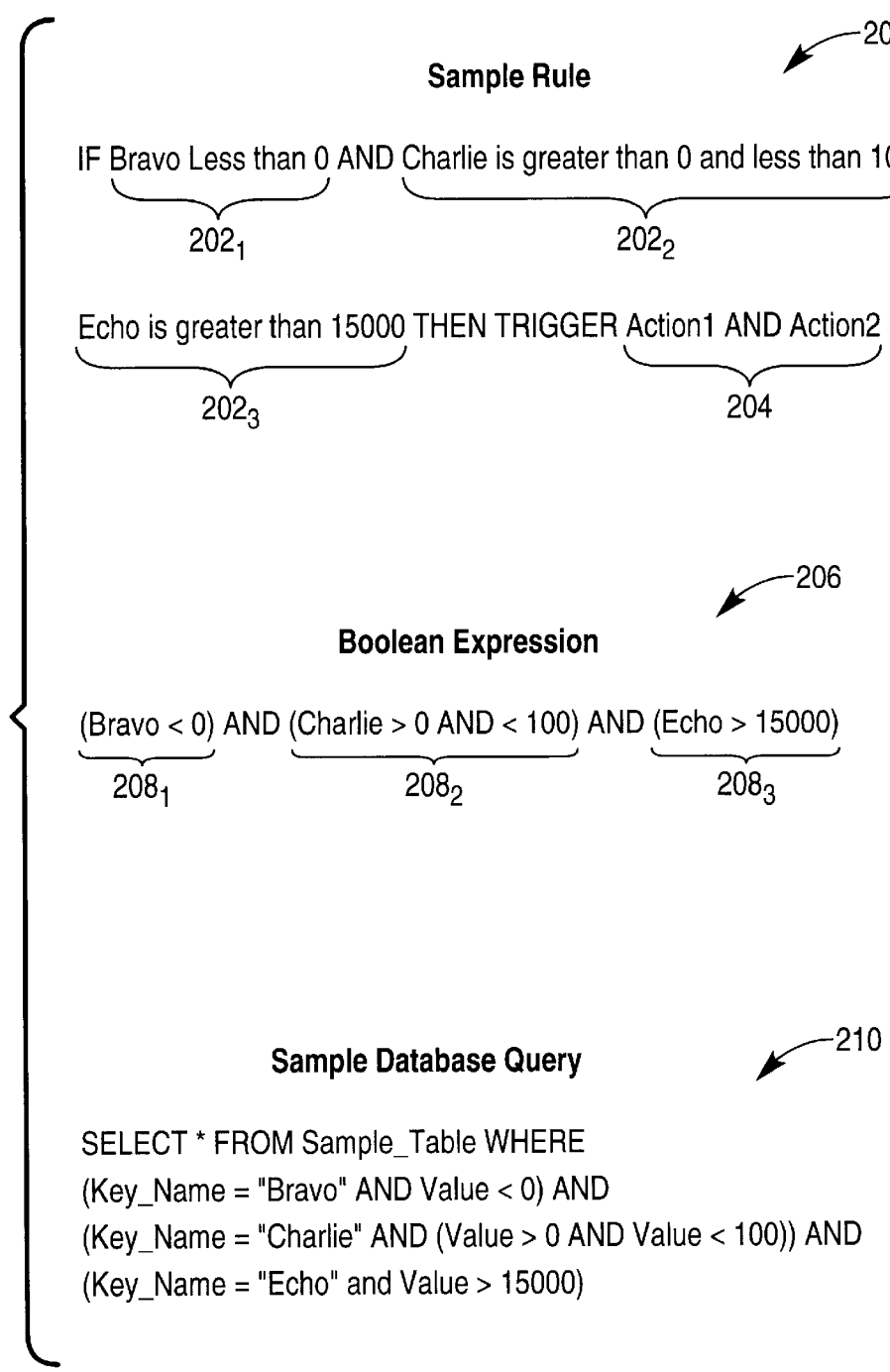
FIG. 5 shows a sample rule, a sample Boolean expression, and a sample database query.

For example, a sample rule 200 is shown in FIG. 5. The sample rule 200 includes conditions $202_1$, $202_2$, and $202_3$ that must be satisfied before associated actions 204 are executed. The sample rule 200 may be represented by a Boolean expression 206 that includes sub-expressions $208_1$, $208_2$, and $208_3$. Moreover, the management system 10 may construct a database query 210 that requests all rows of information stored in the database 24 that satisfy the Boolean expression 206.

After constructing the database query, the management system 10 generates in step 108 the second parameter CountMaxRows and the third parameter EvaluateAsAnd for the software function PerformAnonymousQuery. Since in the preferred embodiment of the management system 10 a user defines a rule by defining a group of conditions that are each satisfied by a single row of information of the database 24, the maximum number of rows expected in the database result table is equal to the number of conditions defined in the selected rule. Accordingly, the management system 10 determines the number of conditions included in the selected rule and sets the second parameter CountMaxRows to the determined number of conditions.

Moreover, since in the preferred embodiment of the management system 10 a user defines a rule as either (i) a group of conditions joined by a logical AND operator, or (ii) a group of conditions joined by a logical OR operator, the management system 10 determines whether the selected rule is a logical AND expression. If the selected rule is a logical AND expression, then the management system 10 sets the third parameter EvaluateAsAnd equal to a true value. However, if the selected rule is not a logical AND expression, then the management system 10 sets the third parameter EvaluateAsAnd equal to a false value.

Then in step 110 a processor or a group of processors of the management system 10 being execution of the software function PerformAnonymousQuery using the parameters generated by the management system in steps 104 and 106 of the evaluation method 100. In response to executing the software function PerformAnonymousQuery, a database result table is generated. In particular, the database result table includes each row of information of the database 24 that satisfies the criteria of the database query represented by the first parameter SQLQuery.

For example, FIG. 6 illustrates the contents of a sample database 220 and the contents of a sample database result table 230. The sample database 220 includes database rows $222_1 \ldots 222_5$ in which are stored information, and the sample database result table 230 includes result rows $232_1$, and $232_2$. In particular, the result rows $232_1$ and $232_3$ contain information of the sample database 220 that satisfy the conditions of the sample database query 210 and respectively correspond to the database rows $222_2$ and $222_3$ of the sample database 220.

The management system 10 in step 112 analyzes the database result table generated in step 110 to determine whether the selected rule has been satisfied. In particular, in response to executing the software function PerformAnonymousQuery, the management system 10 in step 112 counts the number of result rows generated in step 110. For example, the management system 10 would determine in step 112 that the sample database result table 230 contains two result rows of information.

After analyzing the database result table, the management system 10 in step 114 determines whether the conditions of the selected rule have been satisfied. To this end, the management system 10 determines that the conditions of the selected rule have been satisfied if (i) the third parameter EvaluateAsAnd is representative of a true value, and (ii) the determined number of result rows contained in the database result table is equal to the second parameter CountMaxRows. Moreover, the management system 10 determines that the conditions of the selected rule have been satisfied if (i) the third parameter EvaluateAsAnd is not representative of a true value, and (ii) the number of result rows contained in the database result table is greater than or equal to a value of one. In all other cases, the management system 10 determines that the conditions of the selected rule have not been satisfied.

If the management system 10 determines that the conditions of the selected rule have not been satisfied then the management system 10 proceeds to step 118 in order to determine whether the rule list contains rules that have not been selected for processing. However, if the management system 10 determines that the conditions of the selected rule have been satisfied then the management system 10 proceeds to step 116.

In step 116, the management system 10 causes the actions associated with the selected rule to be executed. Then, the management system 10 in step 118 determines whether all rules listed in the rule list have been selected for processing. If all the rules have not been selected, then the management system 10 returns to step 104 in order to (i) select another rule from the rule list, and (ii) determine whether the conditions of the selected rule have been satisfied.

While the invention has been illustrated and described in detail in the drawings and foregoing description, such illustration and description is to be considered as exemplary and not restrictive in character, it being understood that only a preferred embodiment has been shown and described and that all changes and modifications that come within the spirit of the invention are desired to be protected.

For example, in order to better illustrate features of the present invention, the present invention has been described utilizing a database that (i) stores information in rows, and (ii) returns information in a results table having result rows that contain information that satisfy a database query. However, it should be appreciated by those skilled in the art that features of the present invention may be implement in accord with a database that does not store information in rows and return information in rows. In particular, features of the present invention could be practiced with a database that returns a set of database records that contain information that satisfy a database query. Moreover, the software function PerformAnonymousQuery could be altered to obtain a record count of the resulting set database records and generate a truth value based upon the record count.

What is claimed is:

1. A method of determining the Boolean truth value of an expression that incorporates an arbitrary reference to an external database, comprising the steps of:

generating a database query that correlates to the expression;

processing said database query in whole to obtain database result information from the external database; and resolving said expression into a Boolean truth value by analyzing said database result information.

2. The method of claim 1, wherein:

said expression comprises a Boolean expression.

3. The method of claim 1, wherein:

said database result information comprises a set of database records; and said resolving step includes the steps of (i) obtaining a record count for said set of database records, and (ii) generating said Boolean truth value based upon said record count.

4. The method of claim 1, wherein:

said database result information comprises a certain number of database records if said expression evaluates to a Boolean truth value of true; and said resolving step includes the steps of (i) determining whether said database result information includes said certain number of database records, and (ii) in response to determining that said database result information includes said certain number of database records, causing said Boolean truth value to be representative of true.

5. The method of claim 1, wherein:

said database result information comprises a number of database records; and said resolving step includes the steps of (i) determining that said expression consists of a series of subexpressions that are linked by a logical OR operator, (ii) obtaining a record count for said database result information, and (iii) in response to determining that said expression consists of said series of subexpressions, causing said Boolean truth value to be representative of true if said record count is greater than or equal to one.

6. The method of claim 1, wherein:

said database result information comprises a certain number of database records if said expression evaluates to a true value; and said resolving step includes the steps of (i) determining whether said expression consists of a series of subexpressions that are linked by a logical AND operator, (ii) in response to determining that said expression consists of said series, determining whether said database result information includes said certain number of database records, and (iii) in response to determining that said database result information includes said certain number of database records, causing said Boolean truth value to be representative of true.

7. A method of determining the Boolean truth value of a Boolean expression that incorporates an arbitrary reference to an external database and that comprises a first sub-expression, said method comprising the steps of:

generating a database query that correlates to the Boolean expression;

processing said database query in whole to obtain a database result table from the external database that includes a first result row if a first database row of a database table satisfies said first sub-expression; and resolving said Boolean expression into a truth value by analyzing said database result table.

8. The method of claim 7, wherein:

said resolving step includes the steps of (i) determining a row count for said database result table, and (ii) generating said truth value based upon said row count.

9. The method of claim 7, wherein:

said Boolean expression further comprises a second sub-expression and a Boolean operator which joins said first sub-expression and said second sub-expression, and said processing step includes the step of causing said database result table to include a second result row if a second database row of said database table satisfies said second sub-expression.

10. The method of claim 7, wherein:

said Boolean expression further comprises a plurality of additional sub-expressions and a Boolean operator that joins said first sub-expression and said plurality of additional sub-expressions, and said processing step includes the step of causing said database result table to include an additional result row for each database row of said database table that satisfies an additional sub-expression of said plurality of additional sub-expressions.

11. The method of claim 10, wherein:

said Boolean operator is a logical OR operator, and said resolving step includes the steps of (i) obtaining a row count for said database result table, and (ii) causing said truth value to be representative of a true value if said row count is greater than or equal to one.

12. The method of claim 10, wherein:

said resolving step includes the steps of (i) determining whether said Boolean operator is a logical OR operator, (ii) obtaining a row count for said database result table, and (iii) in response to determining that said Boolean operator is said logical OR operator, causing said truth value to be representative of a true value if said row count is greater than or equal to one.

13. The method of claim 10, wherein:

said Boolean operator is a logical AND operator, and said resolving step includes the steps of (i) obtaining a row count for said database result table, (ii) determining a sub-expression count for said Boolean expression, and (iii) causing said truth value to be representative of a true value if said row count is equal to said sub-expression count.

14. The method of claim 10, wherein:

said resolving step includes the steps of (i) determining whether said Boolean operator is a logical AND operator, (ii) obtaining a row count for said database result table, (iii) determining a sub-expression count for said Boolean expression, and (iv) in response to determining that said Boolean operator is said logical AND operator, causing said truth value to be representative of a true value if said row count is equal to said sub-expression count.

15. A computer readable medium that configures a processor to determine the truth value of a Boolean expression that incorporate an arbitrary reference to an external database that comprises a first sub-expression, said computer readable medium comprising:

a plurality of instructions which when executed by said processor causes said processor to (i) generate a database query that correlates to said Boolean expression, (ii) process said database query in whole to obtain a database result table from the external database that includes a first result row if a first database row of a database table satisfies said first sub-expression, (iii) resolve said Boolean expression into a truth value by analyzing said database result table.

16. The computer readable medium of claim 15, wherein said plurality of instructions which when executed by said processor further causes said processor to (i) determine a row count for said database result table, and (ii) generate said truth value based upon said row count.

17. The computer readable medium of claim 15, wherein:

said Boolean expression further comprises a second sub-expression and a Boolean operator which joins said first sub-expression and said second sub-expression, and said plurality of instructions which when executed by said processor further causes said processor to include a second result row in said database result table if a second database row of said database table satisfies said second sub-expression.

18. The computer readable medium of claim 15, wherein:

said Boolean expression further comprises a plurality of additional sub-expressions and a Boolean operator that joins said first sub-expression and said plurality of additional sub-expressions, and said plurality of instructions which when executed by said processor further causes said processor to include an additional result row in said database result table for each database row of said database table that satisfies an additional sub-expression of said plurality of additional sub-expressions.

19. The computer readable medium of claim 18, wherein:

said Boolean operator is a logical OR operator, and said plurality of instructions which when executed by said processor further causes said processor to (i) obtain a row count for said database result table, and (ii) set said truth value such said truth value is representative of a true value if said row count is greater than or equal to one.

20. The computer readable medium of claim 18, wherein:

said Boolean operator is a logical AND operator, and said plurality of instructions which when executed by said processor further causes said processor to (i) obtain a row count for said database result table, (ii) determine a sub-expression count for said Boolean expression, and (iii) set said truth value such that said truth value is representative of a true value if said row count is equal to said sub-expression count.

\* \* \* \* \*